US011720303B1

(12) United States Patent
Wushour

(10) Patent No.: US 11,720,303 B1
(45) Date of Patent: Aug. 8, 2023

(54) SOCIAL MEDIA INFLUENCED PERSONALIZED PRINTING

(71) Applicant: KYOCERA Document Solutions, Inc., Osaka (JP)

(72) Inventor: Dilinur Wushour, Clayton, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/694,622

(22) Filed: Mar. 14, 2022

(51) Int. Cl.
*G06F 3/12* (2006.01)

(52) U.S. Cl.
CPC .......... *G06F 3/1243* (2013.01); *G06F 3/1204* (2013.01); *G06F 3/1256* (2013.01); *G06F 3/1282* (2013.01); *G06F 3/1288* (2013.01)

(58) Field of Classification Search
CPC combination set(s) only.
See application file for complete search history.

(56) References Cited

U.S. PATENT DOCUMENTS

| | | | |
|---|---|---|---|
| 9,531,989 B1 * | 12/2016 | Jehan | G11B 27/28 |
| 10,674,019 B2 | 6/2020 | Matysiak et al. | |
| 10,686,951 B2 | 6/2020 | Matysiak et al. | |
| 10,719,275 B2 | 7/2020 | Matysiak et al. | |
| 11,232,383 B1 * | 1/2022 | Burns, Sr. | G06Q 10/0637 |
| 2002/0146262 A1 * | 10/2002 | Inoue | B41J 11/008 400/70 |
| 2013/0262575 A1 * | 10/2013 | Xiong | H04N 21/47202 709/204 |
| 2015/0363138 A1 * | 12/2015 | Inose | G06F 3/1243 358/1.14 |
| 2016/0335266 A1 * | 11/2016 | Ogle | G06N 20/00 |
| 2017/0310835 A1 | 10/2017 | Kyoo | |
| 2019/0184726 A1 * | 6/2019 | Lamproye | B41M 5/0023 |
| 2022/0405028 A1 * | 12/2022 | Choudhary | G06F 3/1238 |

* cited by examiner

*Primary Examiner* — Helen Zong
(74) *Attorney, Agent, or Firm* — GrowIP Law Group LLC

(57) ABSTRACT

A method is provided that includes receiving, at a cloud server from a client device, a variable print document and customer information associated with a plurality of customers for which the variable print document is to be personalized for each of the plurality of customers. A layout, a business rule, and a style rule are defined for the received variable print document, and a variable print document job file corresponding to the received variable print document and the defined layout is generated. The cloud server extracts, from social media data associated with each of the plurality of customers, a candidate content type and identifies variable content corresponding to the candidate content type, which is used to personalize the variable print document.

17 Claims, 7 Drawing Sheets

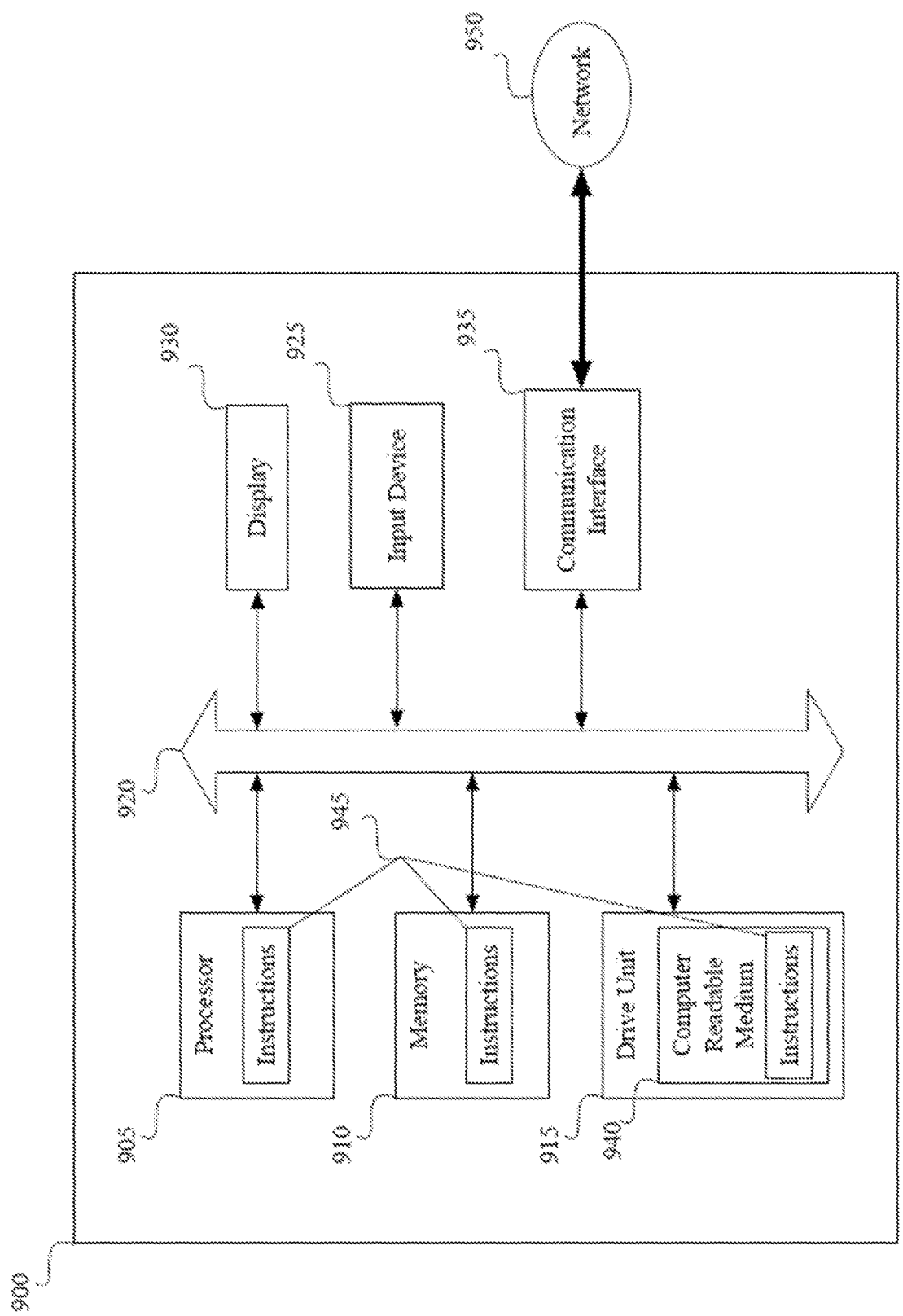

SOCIAL MEDIA INFLUENCED PERSONALIZED PRINTING

FIELD

This disclosure relates to the field of production printing, and, in particular, to printing personalized documents in a high-volume production setting.

BACKGROUND

Variable data printing is becoming increasing important in production printing environments, such as those used for direct marketing, customer relationship management, advertising, and invoicing, among others. For example, variable elements such as text, graphics, and images may be changed from one printed piece to the next, in real-time during production printing process.

Typical, traditional variable data printing processes store the variable data elements in a database or external file, with each variable data element pre-assigned to particular customers, for example. This requires the user to prepare information manually before integrating into the variable printing process.

Needed are improved systems, apparatus, and methods for dynamically generating variable elements on-the-fly, rather than via manually preparation.

SUMMARY

One embodiment set forth herein is directed a method for variable data printing in a production print environment that includes a cloud server and a print device. The method includes: (a) receiving, at the cloud server from a client device via a network communicatively connecting the client device to the cloud server, a variable print document and customer information associated with a plurality of customers for which the variable print document is to be personalized for each of the plurality of customers, (b) defining, at the cloud server, a layout, a business rule, and a style rule for the received variable print document, (c) generating, at the cloud server, a variable print document job file corresponding to the received variable print document and the defined layout, (d) transmitting, from the cloud server to the print device, the variable print document job file, the business rule, and the style rule, (e) requesting, by the print device from the cloud server, personalized content corresponding to each of the plurality of customers, for insertion as variable elements into the variable print document job file, (f) extracting, by the cloud server, from social media data associated with each of the plurality of customers, a candidate content type for each of the plurality of customers, (g) accessing, by the cloud server, for each of the plurality of customers, a variable content database to identify variable content corresponding to the candidate content type, (h) transmitting, from the cloud server to the print device, for each of the plurality of customers, the identified variable content corresponding to the candidate content type, (i) modifying, at the print device, the variable print document job file by inserting, for each of the plurality of customers, the identified variable content into the variable print document job file to create an optimized variable print document job file, wherein the identified variable content is inserted into the variable print document job file in accordance with the style rule, and (j) printing, at the print device, the optimized variable print document job file.

A second embodiment set forth herein is directed to a non-transitory computer-readable medium having instructions stored therein to cause at least one processor to perform functions for variable data printing in a production print environment. The functions may include (a) receiving, at a cloud server from a client device via a network communicatively connecting the client device to the cloud server, a variable print document and customer information associated with a plurality of customers for which the variable print document is to be personalized for each of the plurality of customers, (b) defining, at the cloud server, a layout, a business rule, and a style rule for the received variable print document, (c) generating, at the cloud server, a variable print document job file corresponding to the received variable print document and the defined layout, (d) transmitting, from the cloud server to a print device, the variable print document job file, the business rule, and the style rule, (e) requesting, by the print device from the cloud server, personalized content corresponding to each of the plurality of customers, for insertion as variable elements into the variable print document job file, (f) extracting, by the cloud server, from social media data associated with each of the plurality of customers, a candidate content type for each of the plurality of customers, (g) accessing, by the cloud server, for each of the plurality of customers, a variable content database to identify variable content corresponding to the candidate content type, (h) transmitting, from the cloud server to the print device, for each of the plurality of customers, the identified variable content corresponding to the candidate content type, (i) modifying, at the print device, the variable print document job file by inserting, for each of the plurality of customers, the identified variable content into the variable print document job file to create an optimized variable print document job file, wherein the identified variable content is inserted into the variable print document job file in accordance with the style rule, and (j) printing, at the print device, the optimized variable print document job file.

A third embodiment set forth herein is directed to a system having a cloud server and a print device. The cloud server includes a first processor and a first non-transitory computer-readable medium having instructions stored therein to cause the first processor to perform functions on behalf of the cloud server, the functions including: (a) receiving, at the cloud server from a client device via a network communicatively connecting the client device to the cloud server, a variable print document and customer information associated with a plurality of customers for which the variable print document is to be personalized for each of the plurality of customers, (b) defining, at the cloud server, a layout, a business rule, and a style rule for the received variable print document, (c) generating, at the cloud server, a variable print document job file corresponding to the received variable print document and the defined layout, (d) transmitting, from the cloud server to the print device, the variable print document job file, the business rule, and the style rule; extracting, by the cloud server, from social media data associated with each of the plurality of customers, a candidate content type for each of the plurality of customers, (e) accessing, by the cloud server, for each of the plurality of customers, a variable content database to identify variable content corresponding to the candidate content type, and (f) transmitting, from the cloud server to the print device, for each of the plurality of customers, the identified variable content corresponding to the candidate content type. The print device comprises a second processor and a second non-transitory computer-readable medium having instructions stored therein to cause the second processor to perform functions on behalf of the print device, the functions including: (a) requesting, by the print device from the cloud server, personalized content corresponding to each of the plurality of customers, for insertion as variable elements into the variable print document job file, (b) modifying, at the print device, the variable print document job file by inserting, for each of the plurality of customers, the identified variable content into the variable print document job file to create an optimized variable print document job file, wherein the identified variable content is inserted into the variable print document job file in accordance with the style rule, and (c) printing, at the print device, the optimized variable print document job file.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

The accompanying drawings are included to provide a further understanding of the systems, apparatus, devices, and/or methods of the disclosure, and are incorporated in and constitute a part of this specification. The drawings are not necessarily to scale, and sizes of various elements may be distorted for clarity and/or illustrated as simplistic representations to promote comprehension. The drawings illustrate one or more embodiments of the disclosure, and together with the description, serve to explain the principles and operation of the disclosure.

FIG. 5 is a simplified block diagram illustrating an example computer system that may be utilized in one or more example embodiments.

DETAILED DESCRIPTION

Figure 1:
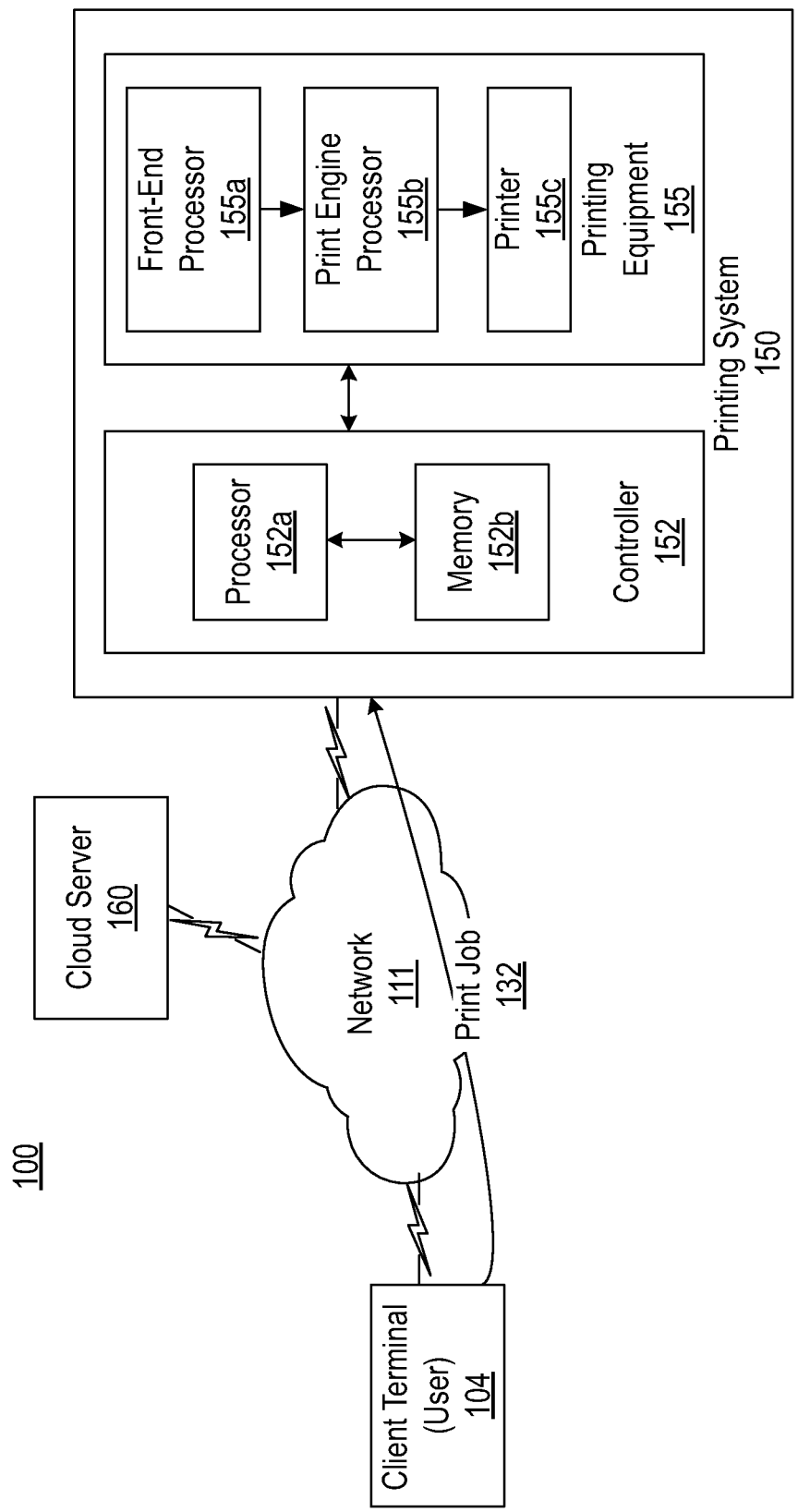
FIG. 1 is a simplified block diagram illustrating an environment that includes various entities that cooperate to facilitate providing social media influenced personalized printing, according to an example embodiment.

Example systems, apparatus, devices, and/or methods are described herein. It should be understood that the word "example" is used to mean "serving as an example, instance, or illustration." Any embodiment or feature described herein as being an "example" is not necessarily to be construed as preferred or advantageous over other embodiments or features unless stated as such. Thus, other embodiments can be utilized, and other changes can be made, without departing from the scope of the subject matter presented herein. The aspects described herein are not limited to specific embodiments, apparatus, or configurations, and as such can, of course, vary. It should be readily understood that the aspects of the present disclosure, as generally described herein, and illustrated in the figures, can be arranged, substituted, combined, separated, and designed in a wide variety of different configurations. It is also to be understood that the terminology used herein is for the purpose of describing particular aspects only, and unless specifically defined herein, is not intended to be limiting.

Throughout this specification, unless the context requires otherwise, the words "comprise" and "include" and variations (e.g., "comprises," "comprising," "includes," "including," "has," and "having") will be understood to imply the inclusion of a stated component, feature, element, or step or group of components, features, elements, or steps, but not the exclusion of any other component, feature, element, or step or group of components, features, elements, or steps.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

As used in the specification and the appended claims, the singular forms "a," "an," and "the" include plural referents unless the context clearly dictates otherwise.

Ranges can be expressed herein as from "about" one particular value and/or to "about" another particular value. When such a range is expressed, another aspect includes from the one particular value and/or to the other particular value. Similarly, when values are expressed as approximations by use of the antecedent "about," it will be understood that the particular value forms another aspect. It will be further understood that the endpoints of each of the ranges are significant both in relation to the other endpoint and independently of the other endpoint.

Any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

To assist in providing social media influenced personalized printing, the presently described technology includes various add-ons, substitutions, and/or rules to personalized production printing. In one example, advertisements or other variable element contents are generated dynamically using social media and/or publicly available browsing history to recommend articles, services, products, and/or sports events. Those personalized advertisements or other variable element contents are inserted into a variable data printing process to create a highly customized digital printing workflow that reflects an individual customer's personal interests, needs, and/or specialties, for example.

FIG. 1 is a simplified block diagram illustrating an environment 100 that includes various entities that cooperate to provide social media influenced personalized printing functionality, according to an example embodiment. Example entities of the environment 100 can include a client terminal 104 (with which a user may be associated), a printing system 150 (also referred to herein as a print device), and a cloud server 160. The various entities of the environment 100 can be configured to communicate with one another via a network 111, such as a Local Area Network (LAN), Wide Area Network (WAN), such as the Internet, or another type of wired or wireless network.

The printing system 150 can include a controller 152 and printing equipment 155, as illustrated in FIG. 1. In one example, the controller 152 can be configured to coordinate operations performed by the printing equipment 155. For example, the controller 152 can be configured to receive print job requests 132 (also referred to as "print jobs," "print files," and/or "print job files" herein) from entities (e.g., the client terminal 104) outside of the printing system 150 and to communicate the print job requests 132 to the printing equipment 155. As described in more detail below, the controller 152 can be further configured to provide functionality to the printing system 150 that allows end users, such as client terminal 104, to provide social media influenced personalized printing functionality for print jobs sent via print job requests 132. The controller 152 may communicate with a cloud server 160, described in further detail with respect to FIG. 2, to assist in providing such functionality.

In one example, the printing equipment 155 can include a Front-End Processor (FEP) 155a, a Print Engine Processor (PEP) 155b, and one or more printers 155c. The FEP 155a, also referred to as a Digital Front-End (DFE) herein, can be configured to convert bitmap images, vector graphics, fonts, etc., associated with pages specified in the print job request 132 to a bitmap/rasterized representation of the image (e.g., C, M, Y, and K pixels). The manner in which the FEP 155a rasterizes the pages specified in the print job request can depend on various image rasterization parameters of the FEP 155a. For example, these image rasterization parameters may include and/or effect calibration curves, paper definitions, international color consortium profiles (ICC profiles), spot color definitions, tone adjustment curves, color conversion settings, colorant limits (e.g., ink, toner), rendering intent, K preservation, CGR level, etc., max colorant densities, print margin, and/or halftones.

In one example, the PEP 155b can be included or in communication with the printer 155c. The printer 155c can correspond to an industrial printer, for example, such as one capable of printing thousands of pages an hour. In this regard, the printer 155c can be ink-based, toner-based, or can use a different medium. The PEP 155b can include various parameters that can control the operation of the printer 155c, based on print instructions included in or with the print job request 132.

The controller 152 can include a processor 152a and a memory 152b. The controller 152 can include other subsystems, such as an input/output (I/O) subsystem, for example. The processor 152a is in communication with the memory 152b. The processor 152a is configured to execute instruction code stored in the memory 152b. The instruction code facilitates performing, by the controller 152, various functions associated with providing social media influenced personalized printing functionality for print jobs sent via print job requests 132. The processor 152a can correspond to a stand-alone computer system such as an Intel®, AMD®, or ARM® based computer system or a different computer system and can include application-specific computer systems. The computer system can include an operating system, such as Microsoft Windows®, Linux, Unix®, Mac OS®, or a different operating system. In addition, the operations performed by the various subsystems can be combined into a fewer or greater number of subsystems to facilitate speed scaling, cost reductions, etc. Further example implementation details of the controller 152 and other computer systems are described with reference to FIG. 5.

While, in the example of FIG. 1 and elsewhere throughout this description, the controller 152 is illustrated and described as implementing at least a portion of the social media influenced personalized printing functionality, some or all of the social media influenced personalized printing functionality may instead be implemented elsewhere in the printing system 150 or in another related, associated, or connected device or system.

Figure 2:
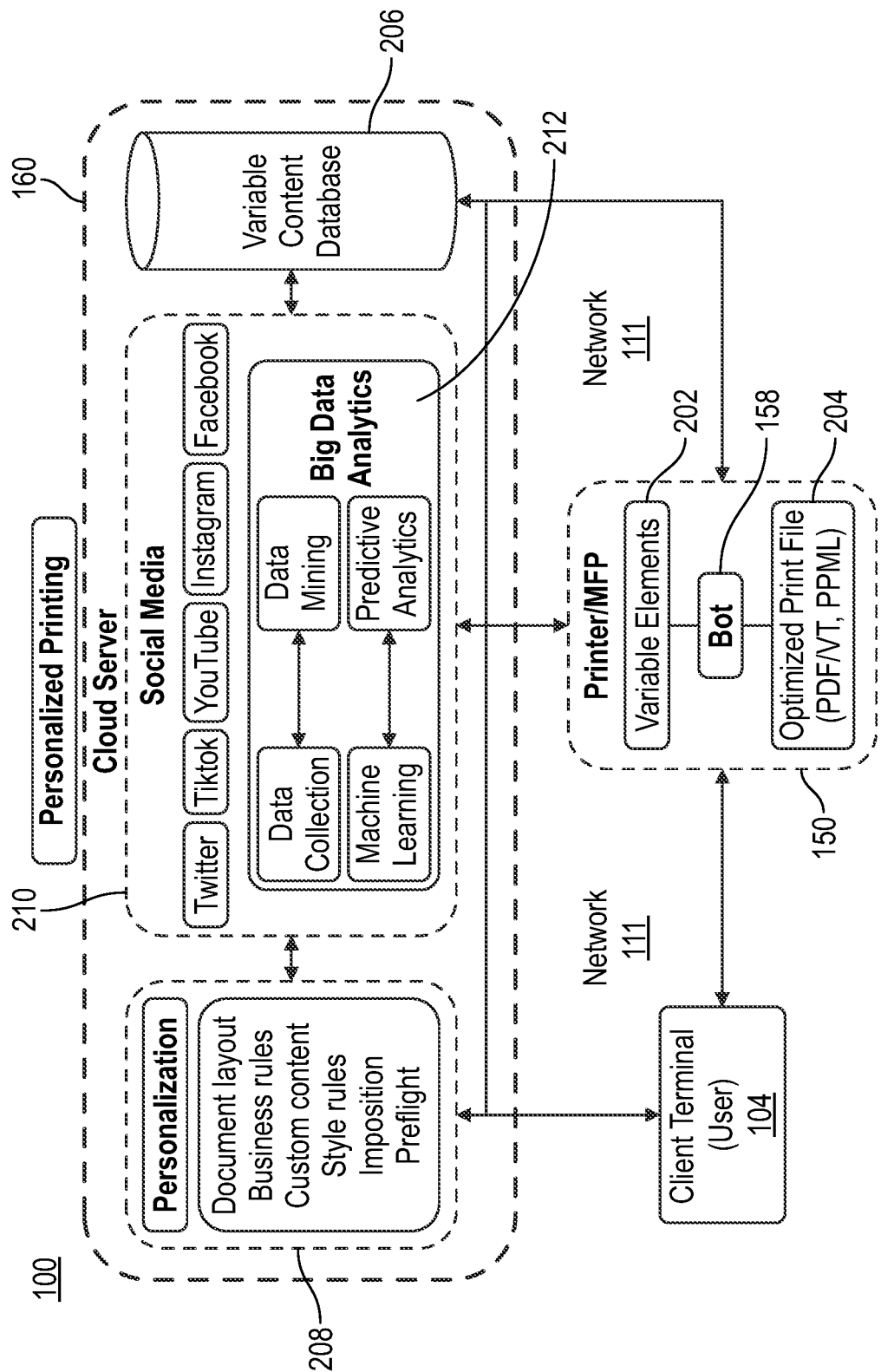
FIG. 2 is a simplified block diagram illustrating the environment of FIG. 1, with additional components cooperating to provide social media influenced personalized printing, according to an example embodiment.
Figure 3A:
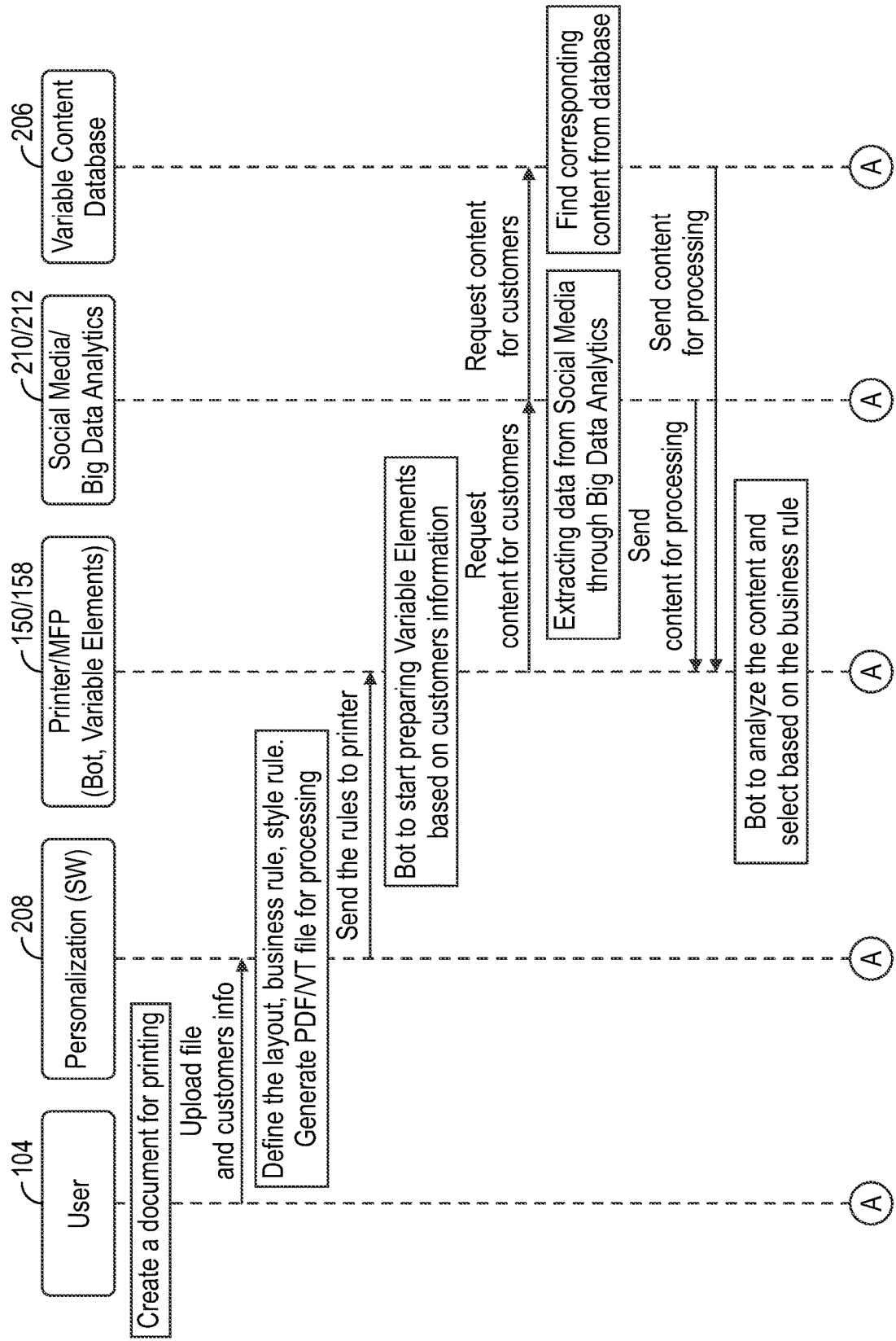
FIG. 3, consisting of two parts illustrated as FIG. 3a and FIG. 3b, is a simplified sequence diagram illustrating communications and messaging between various entities that cooperate to facilitate providing social media influenced personalized printing, according to an example embodiment.
Figure 3B:
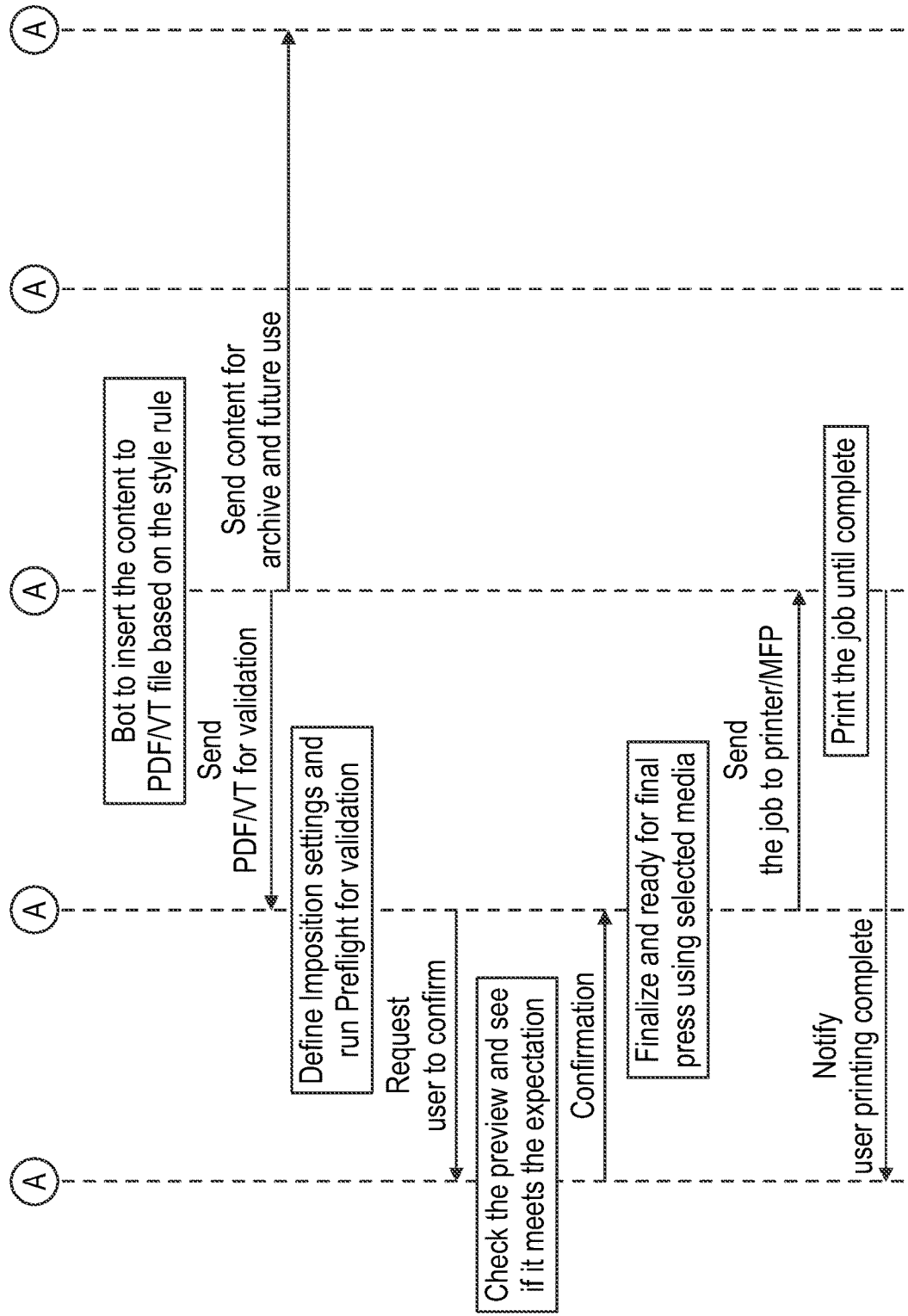

FIG. 2 is a simplified block diagram illustrating the environment 100 of FIG. 1, with additional components cooperating to provide social media influenced personalized printing, according to an example embodiment. FIG. 3, consisting of two parts illustrated as FIG. 3a and FIG. 3b, is a simplified sequence diagram illustrating communications and messaging between various entities that cooperate to facilitate providing social media influenced personalized printing, according to an example embodiment. The following discussion references both FIGS. 2 and 3 in stepping through an example sequence that may be used to provide social media influenced personalized printing according to an example embodiment.

The example printing system 150 is illustrated as including a bot 158, which may be implemented via the processor 152a executing instructions stored in the memory 152b of the controller 152 (see FIG. 1) to act on received inputs and generate corresponding outputs according to one or more logical directives or rules. As shown, the bot 158 generates variable elements 202 based, for example, on customer information corresponding to a plurality of customers for which a production print job 132 is being prepared. As described in further detail below, the bot 158 receives and analyzes customer-related content from the cloud server 160. Based on the one or more logical directives or rules, the bot 158 may select a subset of the customer-related content and insert that content into an optimized print file 204 (e.g., a PDF/VT file) based on a style rule for the particular personalized print job 132 being prepared.

The example cloud server 160 includes a variable content database 206 and executable software components including at least a personalization component 208 and a social media component 210. In one example, the personalization component 208 and the social media component 210 are implemented via a processor (not shown in FIG. 1 or 2 but described with reference to FIG. 5) of the cloud server 160 executing instructions stored in a memory (not shown in FIG. 1 or 2 but described with reference to FIG. 5) of the cloud server 160 to act on received inputs and generate corresponding outputs according to one or more logical directives or rules.

According to one example, a document to be personalized for a plurality (or more preferably, a multiplicity, such as hundreds or thousands (or more)) of customers is created (e.g., by a user) at the client terminal 104. The personalization component 208 of the cloud server 160 receives the created document (e.g., print job 132) from the client terminal 104 via the network 111. The document is created, for example, by a user situated at the client terminal 104 and constitutes a personalized document defined by a template and customer information corresponding to the plurality of customers being targeted. Upon receiving the document from the client terminal 104, the personalization component 208 manages, determines, and/or creates the associated document layout, business rules, custom content, style rules, imposition, and/or preflight for the subject document to be personalized for a plurality of customers. The personalization component 208 communicates the business rules and/or style rules to the printing system 150.

Upon receiving the business rules and/or style rules (and any additional necessary information, such as customer information) from the personalization component 208, the printing system 150 (e.g., via the bot 158 implemented by the controller 152) begins preparing variable elements of the personalized document based on the customer information included with the personalized document received from the client terminal 104. For example, the bot 158 (or another component implemented by the controller 152) may communicate a request for content to the social media component 210.

Upon receiving the request for content from the bot 158, the social media component 210 may extract customer data (corresponding to the customer information provided by the client terminal 104 with the document) from one or more of a plurality of social media platforms and/or from data mined from such platforms. Such social media platforms may include platforms selected from Twitter, Tiktok, YouTube, Instagram, Facebook, and/or others available as of the filing of this application or other social media platforms that may be offered later. For example, by using customer information (e.g., name, address, and/or other information) to "crawl" one or more social media websites, apps, or other platform implementations, the social media component 210 may identify one or more candidate content types associated with a particular customer out of a plurality of customers included in the customer information provided by the client terminal 104 with the document. For example, by using a name "Abe Lincoln" and an address "Springfield, Ill., USA," to crawl a plurality of social media platforms, the social media component 210 may identify "wrestling" as a word that appears frequently in social media content posted by, commented on, and/or reacted to by a user named "Abe Lincoln" (or a variation thereof) having a location of Springfield, Ill., USA. As a result, the social media component 210 may identify "wrestling" as a candidate content type for a customer named Abe Lincoln.

A combination of big data analytics technologies 212 may be utilized by the social media component 210 to assist in identifying one or more candidate content types for each of the customers included in the plurality of customers. For example, in addition to crawling social media websites, apps, or other platform implementations, the social media component 210 may also save some or all of the accessed data to a data lake associated with the social media component 210, as part of a data collection process. The collected data saved in the data lake then may be analyzed in one or more data mining processes, which may be useful to help identify candidate content types, including trends over time.

Another big data analytics technology 212 that may be utilized by the social media component 210 is one or more machine learning models (e.g., supervised and/or unsupervised) to identify trends or patterns in the collected data stored in the data lake or in real-time crawled data. Such machine learning models may be trained on training data and/or on actual data collected via crawling. In one example, the machine learning models may assist in identifying variations of a customer's name and/or address, usernames associated with a particular customer across different social media platforms, variations and/or synonyms in particular words and/or phases that might constitute candidate content types, important versus unimportant words or phrases (for candidate content type classification), and others. In addition, the big data analytics technology 212 of the social media component 210 may include predictive analytics functionality (e.g., implemented using machine learning and predictive models, descriptive models, and/or decision models). Such predictive analytics may be used to predict candidate content types based on upcoming events, current news, or other temporal items. As another example, predictive analytics may be used to predict a candidate content type for a particular customer based on a candidate content type associated with a different particular customer (e.g., If customer A likes sailing and biking, then a prediction might be that customer B, who likes sailing, might also like biking.). As yet another example, predictive analytics may be used to identify which information to identify potentially relevant upcoming events, products, or other items of interest to a particular customer. In addition to assisting with identifying a candidate content type, the big data analytics technologies 212 may also provide analytics and information to the printing system 150 (e.g., to the bot 158 in the printing system 150).

Upon identifying one or more candidate content types associated with a particular customer (or set of customers) from the plurality of customers provided by the client terminal 104 with the document, the social media component 210 accesses the variable content database 206. Accessing the variable content database 206 may include communicating with a database server (not shown) associated with the variable content database 206. In one example, accessing the variable content database 206 may include using the identified candidate content types as a key or index, such as one generated by the big data analytics technology 212 using machine learning classification. For example, the candidate content type "wrestling" might be associated with a database key or index of "contact sports" to be used for accessing and/or searching the variable content database 206. Such functionality could be useful for granularity mismatches between mined social media data and data stored in the variable content database.

Returning to the "Abe Lincoln" example, "wrestling" was identified as a candidate content type by the social media component and assume that "contact sports" was generated by the big data analytics technologies 212 as a database key. The social media component 210 may access the variable content database (e.g., via a database server) to determine content (e.g., media) corresponding to "contact sports" (or "wrestling," if in the database or if the database includes separate big data analytics to generate its own keys). For instance, the variable content database 206 may include an image or theme (i.e., library of image(s), text phrases, languages, and/or other variable components for printing) relating to "contact sports." Assume for our example that two images of a boxer (boxing is a contact sport) are identified as content corresponding to the candidate content type. The content constituting the images of the boxer is then communicated to the bot 158 in the printing system 150, either directly or via the social media component 210.

Upon receiving the content (e.g., the two boxer images) from the variable content database 206, the bot 158 analyzes the content with respect to the business rule(s) provided to the bot 158 by the personalization component 208 to determine whether to select the content for personalizing the document. For example, the business rule could specify that only female gender images should be utilized for a particular customer. If the two boxer images include one image showing a male boxer and one image showing a female boxer, then according to this example business rule, the image of the female boxer would be selected for personalizing the document to be printed for the customer "Abe Lincoln."

In addition, the bot 158 would insert the content (the female boxer image) into the document in accordance with the style rules provided to the bot 158 by the personalization component 208. Thus, the bot 158 rearranges the print job file and re-renders it, according to an example embodiment. For example, the bot 158 may insert the female boxer image as content into a bottom-right quadrant of a page of the document, in accordance with the style rules specified for that document provide by the client terminal 104. In one example, the bot 158 creates a file according to the "PDF/VT" file format for personalized documents, with the female boxer image in the bottom-right quadrant being the personalized (variable) content in the personalized document. The bot 158 can then communicate that document (e.g., the PDF/VT file) to the personalization component 208 for validation. For example, the personalization component 208 can define imposition settings and/or run preflight for validation, and request that the client terminal 104 confirm that a preview for a particular customer (e.g., a sample customer out of a plurality of customers) meets expectations of a user associated with the client terminal 104. Upon receiving confirmation from the user terminal 104 that the preview of the personalized document (e.g., the preview of at least a portion of the PDF/VT file) meets a user expectation, then the personalization component 208 finalizes the personalized document for production printing, which may include selecting media, finishing, etc.

Upon finalizing the personalized document for final press, the personalization component 208 sends the print job with the personalized document (e.g., the PDF/VT file) to the printing system 150 for printing on the printing equipment 155. The printing system 150 prints the print job until completed, which may include printing a plurality (e.g., a multiplicity) of personalized documents corresponding to a plurality of customers. The printing system 150 then sends a "job completed" notification to the client terminal 104.

Figure 4A:
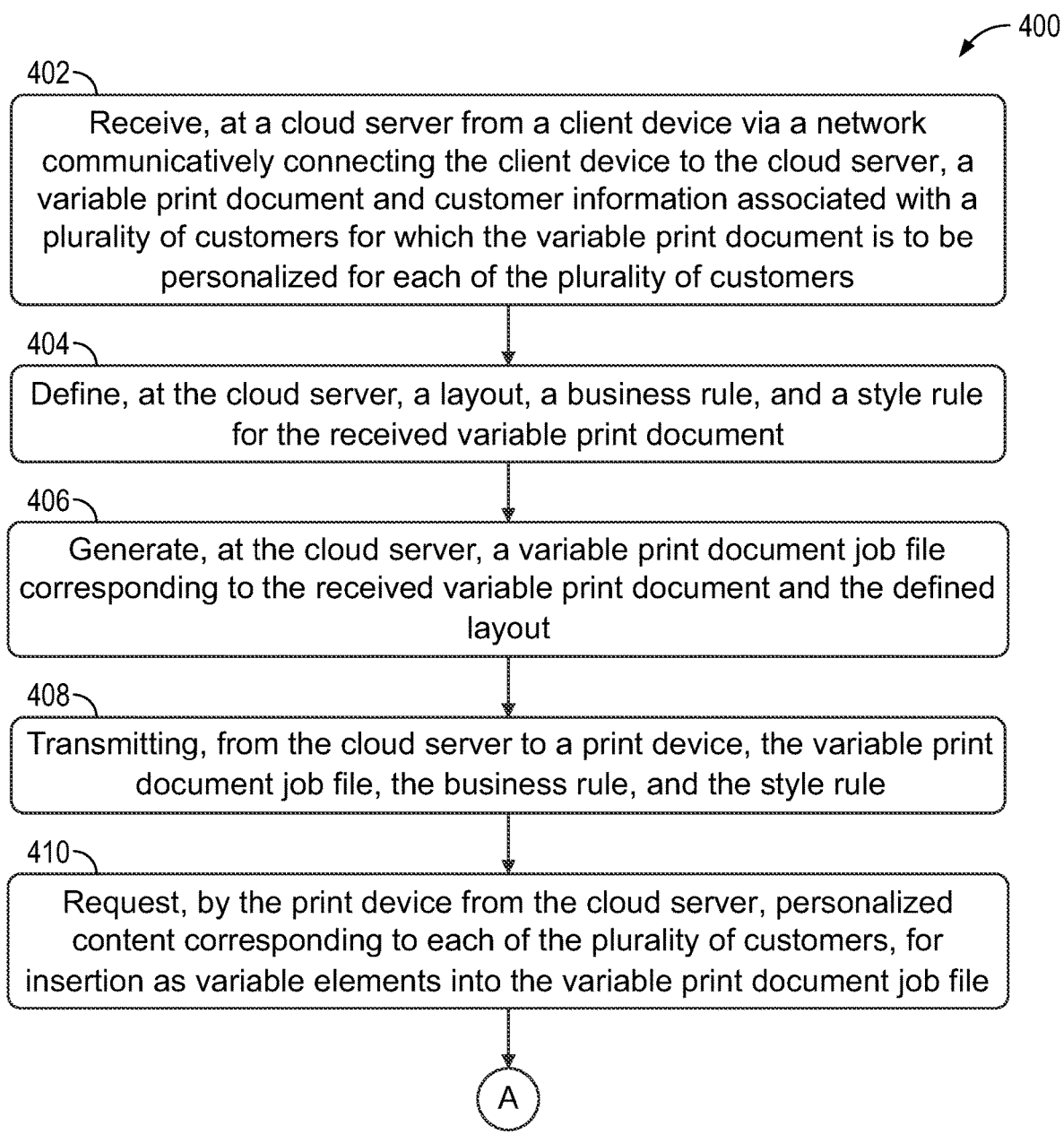
FIG. 4, consisting of two parts illustrated as FIG. 4a and FIG. 4b, is a flow diagram illustrating a method for providing social media influenced personalized printing, according to an example embodiment.

FIG. 4 is a flow diagram illustrating a method 400 for providing social media influenced personalized printing, according to an example embodiment. In particular, method 400 may be used for variable data printing in a production print environment and may represent a specific sequence or series of actions that, when performed, allows for the provision of personalized printing using social media to assist in determining variable print elements for production printing. The method 400 and variations (see the examples set forth in the following description) could be a series or plurality of functions performed by a processor executing instructions stored on a non-transitory computer-readable medium, as described with respect to FIG. 5, for example. In another example, the method 400 could be performed, at least in part, at a printing device having a print controller with at least one processor and a non-transitory computer-readable medium having instructions stored therein to cause the at least one processor to perform functions associated with the method 400, including variations thereof.

In block 402 (FIG. 4A), the method 400 involves receiving, at a cloud server from a client device via a network communicatively connecting the client device to the cloud server, a variable print document and customer information associated with a plurality of customers for which the variable print document is to be personalized for each of the plurality of customers. In block 404, the method 400 involves defining, at the cloud server, a layout, a business rule, and a style rule for the received variable print document. In block 406, the method 400 involves generating, at the cloud server, a variable print document job file corresponding to the received variable print document and the defined layout. In block 408, the method 400 involves transmitting, from the cloud server to the print device, the variable print document job file, the business rule, and the style rule. In block 410, the method 400 involves requesting, by the print device from the cloud server, personalized content corresponding to each of the plurality of customers, for insertion as variable elements into the variable print document job file.

Figure 4B:
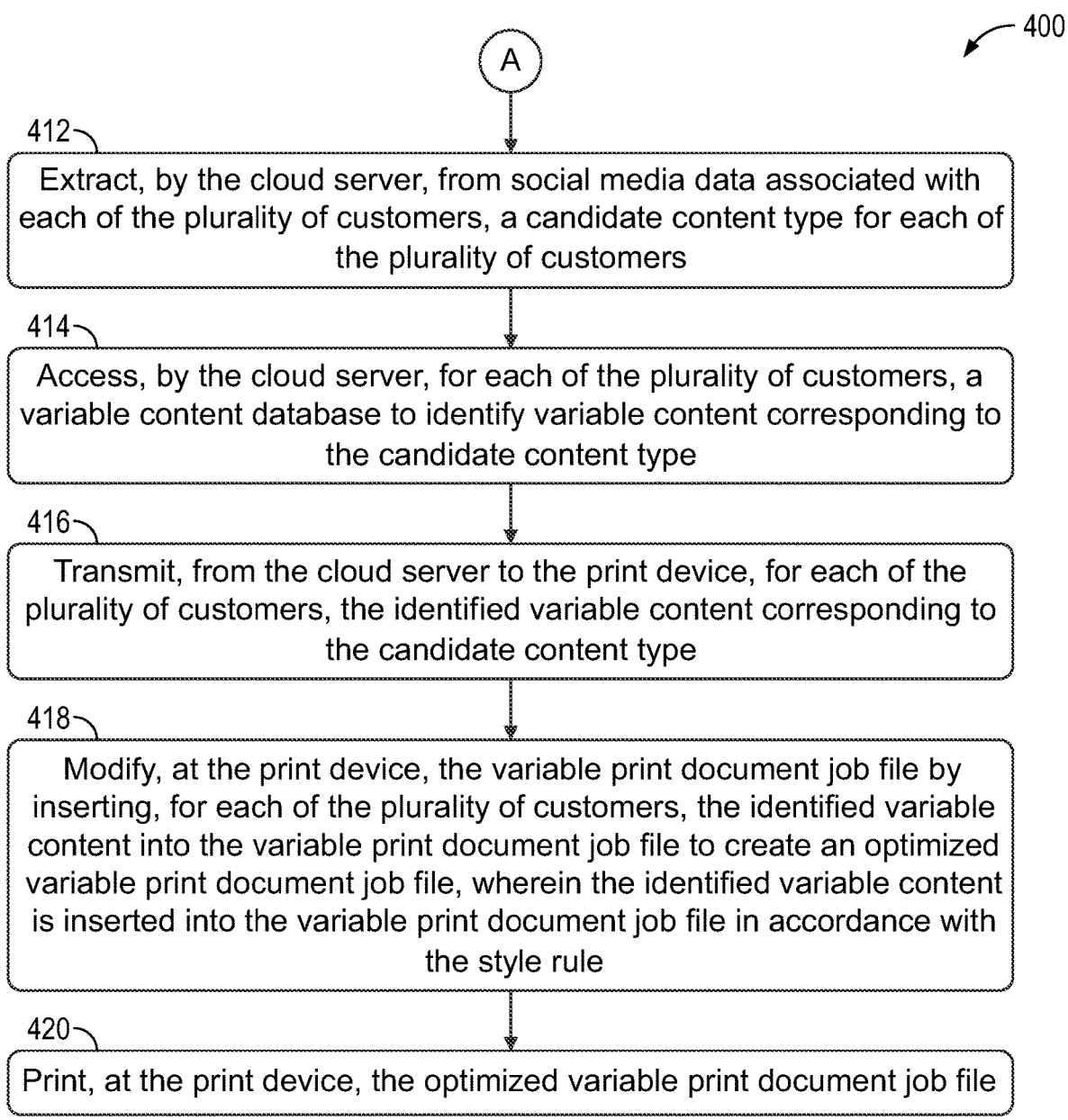

Continuing with the second part of FIG. 4, shown in FIG. 4b, In block 412, the method 400 involves extracting, by the cloud server, from social media data associated with each of the plurality of customers, a candidate content type for each of the plurality of customers. In block 414, the method 400 involves accessing, by the cloud server, for each of the plurality of customers, a variable content database to identify variable content corresponding to the candidate content type. In block 416, the method 400 involves transmitting, from the cloud server to the print device, for each of the plurality of customers, the identified variable content corresponding to the candidate content type. In block 418, the method 400 involves modifying, at the print device, the variable print document job file by inserting, for each of the plurality of customers, the identified variable content into the variable print document job file to create an optimized variable print document job file, wherein the identified variable content is inserted into the variable print document job file in accordance with the style rule. In block 420, the method 400 involves printing, at the print device, the optimized variable print document job file.

Various alternative embodiments involving the method 400 may include additional and/or alternative functions. For example, the method 400 may additionally/alternatively include analyzing, at the print device, for each of the plurality of customers, the identified variable content corresponding to the candidate content type by applying the business rule to the identified variable content to determine suitability of the identified variable content under the applied business rule, wherein the identified variable content is only inserted into the variable print document job file if the identified variable content is determined to be suitable under the applied business rule.

In addition, for the method 400, the social media data could be mined via a web crawler and stored in a data lake for subsequent analysis, or the social media data could be mined via a web crawler and analyzed in real-time by applying a machine learning model to the mined social media data. Or a combination of the two data mining techniques could be utilized, as could other techniques.

As an additional modification, in some embodiments, the method 400 may include, prior to printing, transmitting, by the print device to the cloud server, the optimized variable print document job file, validating, at the cloud server, the optimized variable print document job file, transmitting, from the cloud server to the client device, a print preview of the optimized variable print document job file, and printing, at the print device, the optimized variable print document job file only upon receiving a confirmation from the client device.

For any of the above-described embodiments, the variable print document job file and the optimized variable print document job file may both formatted according to a PDF/VT standard, or some other variable document standard, such as PPML or others. In addition, the identified variable content described with respect to the method 400 may include at least one of an image, text, or graphics, and the candidate content type for each customer of the plurality of customers may include at least one of a word or phrase associated with a social media account associated with that respective customer of the plurality of customers.

FIG. 5 is a simplified block diagram illustrating an example computer system 900 that may be utilized in one or more example embodiments. The computer system 900 can form part of or implement any of the systems and/or devices described above. The computer system 900 can include a set of instructions 945 that the processor 905 can execute to cause the computer system 900 to perform any of the operations described above. The computer system 900 can operate as a stand-alone device or can be connected, e.g., using a network, to other computer systems or peripheral devices, for example.

In a networked example, the computer system 900 can operate in the capacity of a server or as a client computer in a server-client network environment, or as a peer computer system in a peer-to-peer (or distributed) environment. The computer system 900 can also be implemented as or incorporated into various devices, such as a personal computer or a mobile device, capable of executing instructions 945 (sequential or otherwise), causing a device to perform one or more actions. Further, each of the systems described can include a collection of subsystems that individually or jointly execute a set, or multiple sets, of instructions to perform one or more computer operations.

The computer system 900 can include one or more memory devices 910 communicatively coupled to a bus 920 for communicating information. In addition, code operable to cause the computer system to perform operations described above can be stored in the memory 910. The memory 910 can be random-access memory, read-only memory, programmable memory, a hard disk drive, or any other type of memory or storage device.

The computer system 900 can include a display 930, such as a light-emitting diode (LED) display, liquid crystal display (LCD), a cathode ray tube (CRT), or any other display suitable for conveying information. The display 930 can act as an interface for the user to see processing results produced by processor 905.

Additionally, the computer system 900 can include an input device 925, such as a keyboard or mouse or touchscreen, configured to allow a user to interact with components of system 900.

The computer system 900 can also include a disk or optical drive unit 915. The drive unit 915 can include a computer-readable medium 940 in which the instructions 945 can be stored. The instructions 945 can reside completely, or at least partially, within the memory 910 and/or within the processor 905 during execution by the computer system 900. The memory 910 and the processor 905 also can include computer-readable media as discussed above.

The computer system 900 can include a communication interface 935 to support communications via a network 950. The network 950 can include wired networks, wireless networks, or combinations thereof. The communication interface 935 can enable communications via any number of communication standards, such as 802.11, 802.12, 802.20, WiMAX, cellular telephone standards, or other communication standards.

Accordingly, methods and systems described herein can be realized in hardware, software, or a combination of hardware and software. The methods and systems can be realized in a centralized fashion in at least one computer system or in a distributed fashion where different elements are spread across interconnected computer systems. Any kind of computer system or other apparatus adapted for carrying out the methods described herein can be employed.

The methods and systems described herein can also be embedded in a computer program product, which includes all the features enabling the implementation of the operations described herein and which, when loaded in a computer system, can carry out these operations. "Computer program" as used herein refers to an expression, in a machine-executable language, code or notation, of a set of machine-executable instructions intended to cause a device to perform a particular function, either directly or after one or more of (a) conversion of a first language, code, or notation to another language, code, or notation; and (b) reproduction of a first language, code, or notation. Such a computer program may be stored as instructions in a non-transitory computer-readable medium, for example.

The above detailed description sets forth various features and operations of the disclosed systems, apparatus, devices, and/or methods with reference to the accompanying figures. The example embodiments described herein and in the figures are not meant to be limiting, with the true scope being indicated by the following claims. Many modifications and variations can be made without departing from its scope, as will be apparent to those skilled in the art. Functionally equivalent systems, apparatus, devices, and/or methods within the scope of the disclosure, in addition to those described herein, will be apparent to those skilled in the art from the foregoing descriptions. It will be readily understood that the aspects of the present disclosure, as generally described herein, and illustrated in the figures, can be arranged, substituted, combined, separated, and designed in a wide variety of different configurations. Such modifications and variations are intended to fall within the scope of the appended claims. Finally, all publications, patents, and patent applications cited herein are hereby incorporated by reference for all purposes.

The invention claimed is:

1. A method for variable data printing in a production print environment comprising a cloud server and a print device, comprising:
   receiving, at the cloud server from a client device via a network communicatively connecting the client device to the cloud server, a variable print document and customer information associated with a plurality of customers for which the variable print document is to be personalized for each of the plurality of customers;
   defining, at the cloud server, a layout, a business rule, and a style rule for the received variable print document;
   generating, at the cloud server, a variable print document job file corresponding to the received variable print document and the defined layout;
   transmitting, from the cloud server to the print device, the variable print document job file, the business rule, and the style rule;
   requesting, by the print device from the cloud server, personalized content corresponding to each of the plurality of customers, for insertion as variable elements into the variable print document job file;
   extracting, by the cloud server, from social media data associated with each of the plurality of customers, a candidate content type for each of the plurality of customers;
   accessing, by the cloud server, for each of the plurality of customers, a variable content database to identify variable content corresponding to the candidate content type;

transmitting, from the cloud server to the print device, for each of the plurality of customers, the identified variable content corresponding to the candidate content type;

modifying, at the print device, the variable print document job file by inserting, for each of the plurality of customers, the identified variable content into the variable print document job file to create an optimized variable print document job file, wherein the identified variable content is inserted into the variable print document job file in accordance with the style rule;

analyzing, at the print device, for each of the plurality of customers, the identified variable content corresponding to the candidate content type by applying the business rule to the identified variable content to determine suitability of the identified variable content under the applied business rule, wherein the identified variable content is only inserted into the variable print document job file if the identified variable content is determined to be suitable under the applied business rule; and printing, at the print device, the optimized variable print document job file.

2. The method of claim 1, wherein the social media data is mined via a web crawler and stored in a data lake for subsequent analysis.

3. The method of claim 1, wherein the social media data is mined via a web crawler and analyzed in real-time by applying a machine learning model to the mined social media data.

4. The method of claim 1, further comprising:
prior to printing, transmitting, by the print device to the cloud server, the optimized variable print document job file;
validating, at the cloud server, the optimized variable print document job file;
transmitting, from the cloud server to the client device, a print preview of the optimized variable print document job file; and
printing, at the print device, the optimized variable print document job file only upon receiving a confirmation from the client device.

5. The method of claim 1, wherein the variable print document job file and the optimized variable print document job file are both formatted according to a PDF/VT standard.

6. The method of claim 1, wherein the identified variable content comprises at least one of an image, text, or graphics, and wherein the candidate content type for each customer of the plurality of customers comprises at least one of a word or phrase associated with a social media account associated with that respective customer of the plurality of customers.

7. A non-transitory computer-readable medium having instructions stored therein to cause at least one processor to perform functions for variable data printing in a production print environment, the functions comprising:
receiving, at a cloud server from a client device via a network communicatively connecting the client device to the cloud server, a variable print document and customer information associated with a plurality of customers for which the variable print document is to be personalized for each of the plurality of customers;
defining, at the cloud server, a layout, a business rule, and a style rule for the received variable print document;
generating, at the cloud server, a variable print document job file corresponding to the received variable print document and the defined layout;

transmitting, from the cloud server to a print device, the variable print document job file, the business rule, and the style rule;

requesting, by the print device from the cloud server, personalized content corresponding to each of the plurality of customers, for insertion as variable elements into the variable print document job file;

extracting, by the cloud server, from social media data associated with each of the plurality of customers, a candidate content type for each of the plurality of customers;

accessing, by the cloud server, for each of the plurality of customers, a variable content database to identify variable content corresponding to the candidate content type;

transmitting, from the cloud server to the print device, for each of the plurality of customers, the identified variable content corresponding to the candidate content type;

modifying, at the print device, the variable print document job file by inserting, for each of the plurality of customers, the identified variable content into the variable print document job file to create an optimized variable print document job file, wherein the identified variable content is inserted into the variable print document job file in accordance with the style rule;

analyzing, at the print device, for each of the plurality of customers, the identified variable content corresponding to the candidate content type by applying the business rule to the identified variable content to determine suitability of the identified variable content under the applied business rule, wherein the identified variable content is only inserted into the variable print document job file if the identified variable content is determined to be suitable under the applied business rule; and printing, at the print device, the optimized variable print document job file.

8. The non-transitory computer-readable medium of claim 7, wherein the social media data is mined via a web crawler and stored in a data lake for subsequent analysis.

9. The non-transitory computer-readable medium of claim 7, wherein the social media data is mined via a web crawler and analyzed in real-time by applying a machine learning model to the mined social media data.

10. The non-transitory computer-readable medium of claim 7, further comprising:
prior to printing, transmitting, by the print device to the cloud server, the optimized variable print document job file;
validating, at the cloud server, the optimized variable print document job file;
transmitting, from the cloud server to the client device, a print preview of the optimized variable print document job file; and
printing, at the print device, the optimized variable print document job file only upon receiving a confirmation from the client device.

11. The non-transitory computer-readable medium of claim 7, wherein the variable print document job file and the optimized variable print document job file are both formatted according to a PDF/VT standard.

12. The non-transitory computer-readable medium of claim 7, wherein the identified variable content comprises at least one of an image, text, or graphics, and wherein the candidate content type for each customer of the plurality of customers comprises at least one of a word or phrase associated with a social media account associated with that respective customer of the plurality of customers.

13. A system for variable data printing, comprising:
a cloud server and a print device;
wherein the cloud server comprises a first processor and a first non-transitory computer-readable medium having instructions stored therein to cause the first processor to perform functions on behalf of the cloud server, the functions comprising:
  receiving, at the cloud server from a client device via a network communicatively connecting the client device to the cloud server, a variable print document and customer information associated with a plurality of customers for which the variable print document is to be personalized for each of the plurality of customers;
  defining, at the cloud server, a layout, a business rule, and a style rule for the received variable print document;
  generating, at the cloud server, a variable print document job file corresponding to the received variable print document and the defined layout;
  transmitting, from the cloud server to the print device, the variable print document job file, the business rule, and the style rule; extracting, by the cloud server, from social media data associated with each of the plurality of customers, a candidate content type for each of the plurality of customers;
  accessing, by the cloud server, for each of the plurality of customers, a variable content database to identify variable content corresponding to the candidate content type; and
  transmitting, from the cloud server to the print device, for each of the plurality of customers, the identified variable content corresponding to the candidate content type; and
wherein the print device comprises a second processor and a second non-transitory computer-readable medium having instructions stored therein to cause the second processor to perform functions on behalf of the print device, the functions comprising:
  requesting, by the print device from the cloud server, personalized content corresponding to each of the plurality of customers, for insertion as variable elements into the variable print document job file;
  modifying, at the print device, the variable print document job file by inserting, for each of the plurality of customers, the identified variable content into the variable print document job file to create an optimized variable print document job file, wherein the identified variable content is inserted into the variable print document job file in accordance with the style rule;
  analyzing, at the print device, for each of the plurality of customers, the identified variable content corresponding to the candidate content type by applying the business rule to the identified variable content to determine suitability of the identified variable content under the applied business rule, wherein the identified variable content is only inserted into the variable print document job file if the identified variable content is determined to be suitable under the applied business rule; and
  printing, at the print device, the optimized variable print document job file.

14. The system of claim 13, wherein the social media data is mined via a web crawler and stored in a data lake for subsequent analysis.

15. The system of claim 13, wherein the social media data is mined via a web crawler and analyzed in real-time by applying a machine learning model to the mined social media data.

16. The system of claim 13,
wherein the functions performed by the first processor on behalf of the cloud server further comprise:
  validating, at the cloud server, the optimized variable print document job file; and
  transmitting, from the cloud server to the client device, a print preview of the optimized variable print document job file;
and wherein the functions performed by the second processor on behalf of the print device further comprise
  prior to printing, transmitting, by the print device to the cloud server, the optimized variable print document job file; and
  printing, at the print device, the optimized variable print document job file only upon receiving a confirmation from the client device.

17. The system of claim 13, wherein the identified variable content comprises at least one of an image, text, or graphics, and wherein the candidate content type for each customer of the plurality of customers comprises at least one of a word or phrase associated with a social media account associated with that respective customer of the plurality of customers.

* * * * *